United States Patent
Ren et al.

(10) Patent No.: US 9,723,639 B2
(45) Date of Patent: Aug. 1, 2017

(54) COMMUNICATION METHOD AND TERMINAL

(71) Applicant: Xiaomi Inc., Beijing (CN)

(72) Inventors: Qiao Ren, Beijing (CN); Ziguang Gao, Beijing (CN); Ming Zhao, Beijing (CN); Qiang Fu, Beijing (CN)

(73) Assignee: Xiaomi Inc., Beijing (CN)

( * ) Notice: Subject to any disclaimer, the term of this patent is extended or adjusted under 35 U.S.C. 154(b) by 21 days.

(21) Appl. No.: 14/752,001

(22) Filed: Jun. 26, 2015

(65) Prior Publication Data

US 2016/0128106 A1  May 5, 2016

Related U.S. Application Data (63) Continuation of application No. PCT/CN2015/071880, filed on Jan. 30, 2015.

(30) Foreign Application Priority Data

Oct. 29, 2014  (CN) .......................... 2014 1 0594883

(51) Int. Cl.
*H04W 76/02*  (2009.01)
*H04W 48/18*  (2009.01)
(Continued)

(52) U.S. Cl.
CPC ........... *H04W 76/02* (2013.01); *H04W 48/18* (2013.01); *H04W 72/048* (2013.01); *H04W 72/0453* (2013.01); *H04W 84/12* (2013.01)

(58) Field of Classification Search
CPC .............................. H04W 76/02; H04W 48/18
(Continued)

(56) References Cited

U.S. PATENT DOCUMENTS

2005/0083899 A1* 4/2005 Babbar ................ H04W 88/06
370/342
2008/0291862 A1  11/2008 Lu
(Continued)

FOREIGN PATENT DOCUMENTS

CN      201260226 Y    6/2009
CN      103731881 A    4/2014
(Continued)

OTHER PUBLICATIONS

International Search Report dated May 29, 2015 for corresponding International Patent Application No. PCT/CN2015/071880, 4 pages.
(Continued)

*Primary Examiner* — Ronald B Abelson (57) ABSTRACT

A communication method and a terminal are provided. The terminal may be equipped with circuitry that supports connecting to a wireless router using two or more frequency bands. The router may provide multiple networks using respective frequency bands. The terminal may be connected to the router a first frequency band. The method and terminal may facilitate establishment of a direct communication between the terminal and another terminal that is connected to the router using a network of a second frequency band. The another terminal may be equipped with a circuitry that only supports the second frequency band. The method and terminal describe determining a network that a target communication device is connected to, and connecting the terminal to that network. The terminal may then communicate with the target communication device through the network.

10 Claims, 5 Drawing Sheets

(51) Int. Cl.
*H04W 72/04* (2009.01)
*H04W 84/12* (2009.01)

(58) Field of Classification Search
USPC .......................................................... 370/338
See application file for complete search history.

(56) References Cited

U.S. PATENT DOCUMENTS

| | | | | |
|---|---|---|---|---|
| 2010/0145161 | A1* | 6/2010 | Niyato ................ | G06F 19/3418 600/300 |
| 2013/0083661 | A1* | 4/2013 | Gupta ................ | H04W 28/0215 370/235 |
| 2013/0316711 | A1* | 11/2013 | Nakamura ........ | H04W 36/0066 455/436 |
| 2014/0043979 | A1* | 2/2014 | Etemad ................ | H04B 7/2656 370/237 |
| 2014/0068027 | A1 | 3/2014 | Flacco et al. | |
| 2014/0219272 | A1 | 8/2014 | Shuman et al. | |

FOREIGN PATENT DOCUMENTS

| | | |
|---|---|---|
| EP | 2672761 A1 | 12/2013 |
| JP | 2000049961 A | 2/2000 |
| JP | 2000308142 A | 11/2000 |
| JP | 2005176101 A | 6/2005 |
| JP | 2010011397 A | 1/2010 |
| JP | 2014027450 A | 2/2014 |
| RU | 2480956 C2 | 4/2013 |
| WO | WO2014142966 A1 | 9/2014 |

OTHER PUBLICATIONS

Office Action issued in corresponding Japanese Application No. 2016-555890 with English translation, dated Nov. 29, 2016, 8 pages.
European Communication pursuant to Article 94(3) EPC issued in corresponding European Application No. 15183683.0 dated Jan. 3, 2017, 7 pages.
Official Action and Search Report for Russian Application No. 2015114813 dated May 23, 2016.
International Search Report for International Application No. PCT/CN2015/071880 dated May 29, 2015.
Office Action for Korean Application No. 10-2015-7007833 dated May 31, 2016.

* cited by examiner

Fig. 5

COMMUNICATION METHOD AND TERMINAL

This application is a continuation of International Application No. PCT/CN2015/071880, filed Jan. 30, 2015, which is based upon and claims priority to Chinese Patent Application No. 201410594883.3, filed Oct. 29, 2014, the entire contents of which are incorporated herein by reference.

TECHNICAL FIELD

The present disclosure relates to the field of communication, and more particularly, to a communication method and a terminal.

BACKGROUND

With the development of communication technologies, a dual-frequency wireless router has become popular. For example, a dual-frequency wireless router may work at 2.4 GHz and 5.0 GHz frequency bands at the same time. Compared to a single-frequency wireless router, the dual-frequency wireless router has a higher wireless transmission speed, a better anti-interference performance, a stronger wireless signals, and a higher stability. The dual-frequency wireless router is not prone to drop in network connection relative to a single frequency wireless router. Thus, the dual-frequency wireless router has become the mainstream developing trend of wireless products.

Due to additional costs to equip a terminal with a WIFI chip supporting 2.4 GHz and a WIFI chip supporting 5.0 GHz, not every terminal is equipped with two WIFI chips. Because the communication quality of a 5.0 GHz network is better than the communication quality of a 2.4 GHz network, a terminal equipped with double chips typically connects to the 5.0 GHz network by default when the dual-frequency wireless router is available.

SUMMARY

The present disclosure provides a communication method.

According to a first aspect a communication method, may include receiving a communication operation instruction by a terminal. The communication method may include determining a target communication device corresponding to the communication operation instruction. The communication method may include determining a network that is accessible by the target communication device. The communication method may include connecting to the network. The communication method may include communicating with the target communication device via the network.

According to a second aspect a terminal, may include a communication interface connected to a wireless network via a first network. The terminal may include a processor. The terminal may include a memory for storing instructions executable by the processor; where the processor is configured to. The terminal may include receive a communication operation instruction. The terminal may include determine a target communication device corresponding to the communication operation instruction, where the target communication device is connected to said wireless router via a second network. The terminal may include connect to the second network. The terminal may include communicate with the target communication device through the second network.

According to a third aspect a non-transitory readable storage medium including instructions, executable by a processor in a terminal, for performing a communication method, the method including: receiving a communication operation instruction by a terminal, the terminal connected to a first network provided by a wireless router. The non-transitory readable storage medium may include determining a target communication device corresponding to the communication operation instruction. The non-transitory readable storage medium may include determining a second network that the target communication device is connected to, the second network provided by said wireless router. The non-transitory readable storage medium may include connecting the terminal to the second network. The non-transitory readable storage medium may include establishing a communication between the terminal and the target communication device through the second network.

The technical solutions provided by the embodiments of the present disclosure may include, facilitation of detecting that the terminal and the target communication device are in different networks, whereupon the terminal may automatically switch to the network of the target communication device, so as to communicate with the target communication device.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure, and together with the specification, serve to explain the principles of the present disclosure. The components in the figures are not necessarily to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations, and instead, they are merely examples of devices and methods consistent with some aspects as recited in the appended claims.

Figure 1:
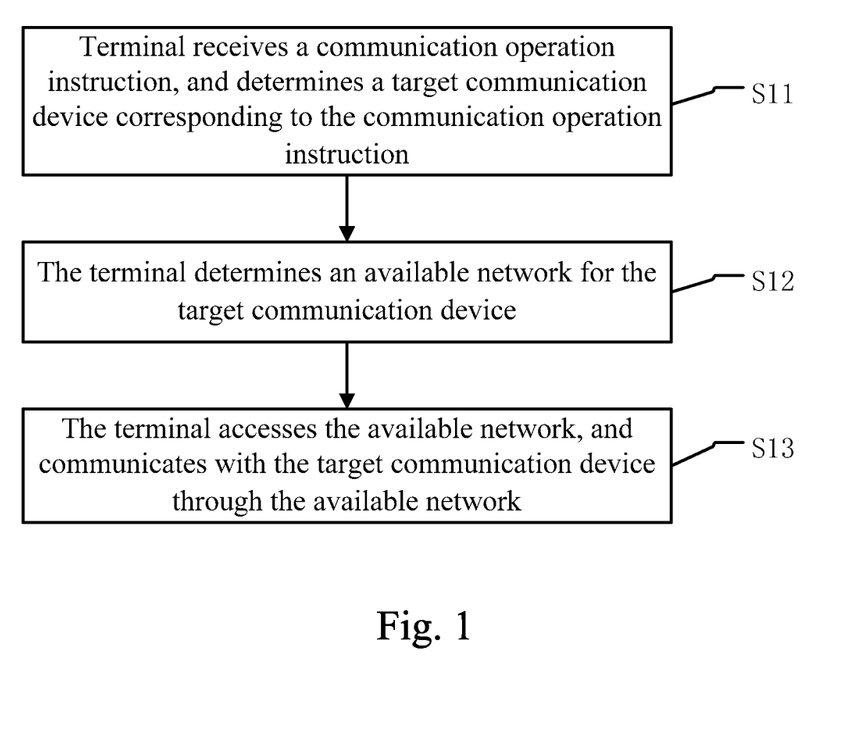
FIG. 1 is a logic showing a communication method, according to an exemplary embodiment.

FIG. 1 is a logic showing a communication method, according to an exemplary embodiment. The communication method provided by the embodiment may be performed using a terminal, including the following steps.

In step S11, a terminal may receive a communication operation instruction, and determine a target communication device corresponding to the communication operation instruction.

Through step S11, the terminal may determine the target communication device. The terminal may be a portable terminal such as a smartphone, a tablet computer, a media player, a personal digital assistant, laptop computer, smartwatch, or any other device which may be used by a user and for communication and controlling other devices. The target communication device may be a smart device such as a smart camera, a smart refrigerator, and a smart water heater, which may receive control signaling sent by the terminal so as to perform a corresponding operation. In an example, the target communication device may be another terminal.

In step S12, the terminal determines an available network for the target communication device.

With the popularization of a dual-frequency wireless router, the terminal and the target communication device may be connected to different networks. Through step S12, the terminal may identify the available network for the target communication device. The terminal may then access the available network and communicate with the target communication device.

For example, the dual-frequency router may provide two APs (Access Point), wherein one AP provides a 2.4 GHz network and the other AP provides a 5.0 GHz network. If the terminal is equipped with double WIFI chips, then the terminal may connect to the 5.0 GHz network. If the target communication device is only equipped with a single WIFI chip that supports 2.4 GHz, then the terminal may switch network connection to be connected to the 2.4 GHz network.

In step S13, the terminal may access the available network and communicate with the target communication device through the available network.

In step S13, when the terminal and the target communication device are connected to the same network, then the terminal may not switch the network the terminal is connected to. Instead, if the terminal and the target communication device are respectively connected to the two different networks available, the terminal may disconnect from the currently connected network and access the network to which the target communication device is connected. The terminal and the target communication device may then communicate with each other.

For example, consider the following scenario. The terminal is connected to the 5.0 GHz network, and the target communication device is connected to the 2.4 GHz network of the dual frequency wireless router. According to the method provided in steps S11-S13, the terminal may be disconnected from the 5.0 GHz network and instead, connected to the 2.4 GHz network. The terminal may communicate with the target communication device using the 2.4 GHz network.

According to the communication method provided, upon detecting that the terminal and the target communication device are in different networks, the terminal may automatically switch to the network in which the target communication device is located, so as to facilitate communications between the terminal and the target communication device.

Figure 2:
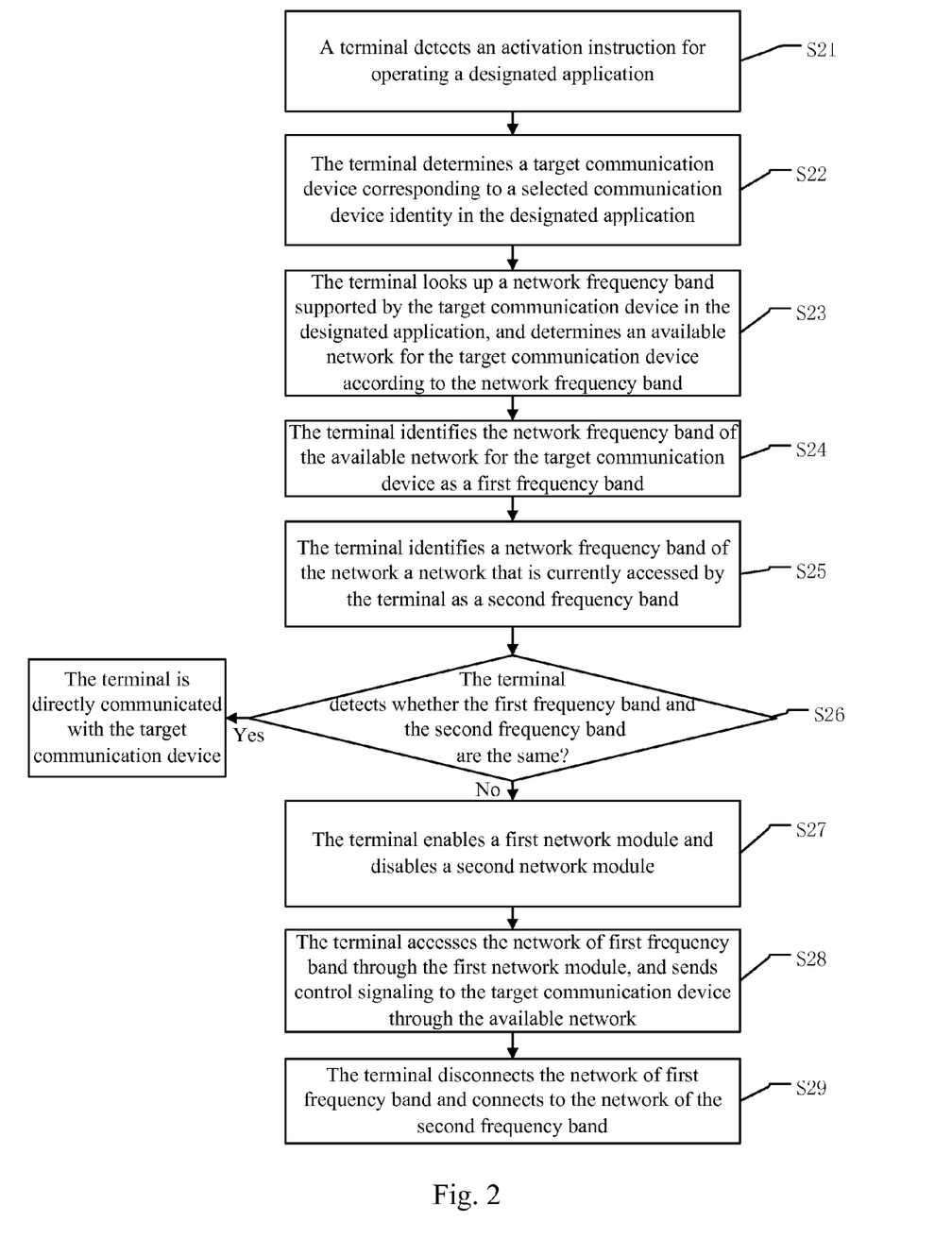
FIG. 2 is a logic showing another communication method, according to an exemplary embodiment.

FIG. 2 is a logic showing another communication method, according to an exemplary embodiment, including the following steps.

In step S21, a terminal may detect an activation instruction for operating a designated application. The terminal may determine the activation instruction as the communication operation instruction.

In step S22, the terminal may determine a target communication device corresponding to a communication operation received via the designated application. For example, the terminal may determine the target communication device based on a communication device identity selected by a user of the designated application.

The steps S21-S22 are possible detailed implementations of step S11 in FIG. 1. In steps S21-S22, the communication operation instruction in step S11 may be the activation instruction for operating the designated application. The designated application may store a communication device identity and network frequency bands supported by the communication device. In an example, the designated application may facilitate communication with multiple communication devices. Accordingly, the designated application may store identities of each communication device and further store frequency bands supported by the communication devices corresponding to each communication device identity. For example, the designated application may be installed on the terminal, and the designated application may be a control application. For example, a plurality of devices may be bound with the terminal through the designated application, such that the terminal may control the devices through the designated application.

In step S23, the terminal looks up a network frequency band supported by the target communication device in the designated application. The terminal may determine the available network for the target communication device according to the network frequency band.

Since the designated application is stored with the network frequency bands supported by each communication device corresponding to each communication device identity, the terminal may determine the available network for the target communication device based on the network frequency bands supported by the target communication device in step S23. For example, consider a scenario where the user has configured a dual-frequency wireless router in the house with SSID (Service Set Identifier) as a "family." The WIFI frequency bands supported by the dual-frequency wireless router may be 2.4 GHz and 5.0 GHz. If the terminal looks up in the designated application that the network frequency band supported by the target communication device is 2.4 GHz, then the available network for the target communication device may be determined as the 2.4 GHz network created by the dual-frequency wireless router with SSID "family."

In step S24, the terminal may determine the network frequency band of the available network for the target communication device as a first frequency band.

In step S25, the terminal detects the current network that is currently accessed by the terminal, and may identify a network frequency band of the current network as a second frequency band.

In the above example, the first frequency band is 2.4 GHz, and the second frequency band is 5.0 GHz. Other examples are possible.

In step S26, the terminal may determine whether the first frequency band and the second frequency band are the same frequency band.

In step S27, if the terminal detects that the first frequency band and the second frequency band are not the same frequency band, the terminal may activate a first network module and deactivate, or disable a second network module. The first network module may be used for accessing a network of the first frequency band, and the second network module may be used for accessing a network of the second frequency band.

In step S28, the terminal may access the available network of the target communication device through the first network module. The terminal may then send a control signal to the target communication device through the available network of the target communication device. The target communication device, in response, may perform a corresponding operation according to the control signal.

For example, the terminal may be equipped with double WIFI chips, which may support the 2.4 GHz network and the 5.0 GHz network of the dual frequency wireless router at the same time. The target communication device may only be equipped with a 2.4 GHz WIFI chip and consequently only supports the 2.4 GHz network.

If the terminal is equipped with double WIFI chips, the terminal may be connected to the 5.0 GHz network by default since the 5.0 GHz network may be better than the 2.4 GHz network. In such a case, when the terminal detects that the target communication device only supports 2.4 GHz, the terminal may close the 5.0 GHz WIFI chip and enable the 2.4 GHz WIFI chip to connect to the 2.4 GHz network, so as to realize the communication with the target communication device.

Since the cost of the 5.0 GHz WIFI chip may be higher than the cost of the 2.4 GHz WIFI chip, and therefore target communication devices may be only equipped with the 2.4 GHz WIFI chip. For example, immovable devices or devices having poor portability may only have one WIFI chip. However, a terminal, which may have a high portability, such as a mobile phone, a tablet computer, or the like may have higher requirements for network compatibility. Therefore, a terminal may be equipped with double WIFI chips. The communication between the terminal and a target communication device may be effectively realized by adopting the communication method as provided in the present disclosure.

In step S29, the terminal may disconnect from the network of the target communication device (such as 2.4 GHz) and accesses the network that the terminal was previously connected to (such as 5.0 GHz), after the communication with the target communication device is completed.

In the foregoing scenario, when the terminal switches from the 5.0 GHz network to the 2.4 GHz network and finishes the communication with the target communication device, the terminal may automatically disconnect from the 2.4 GHz network and reconnect to the 5.0 GHz network. For example, the 2.4 GHz may be a frequency channel or band used by multiple communication devices. Therefore, after finishing the communication, the terminal may reconnect to the 5 GHz frequency band, thus keeping away from the 2.4 GHz frequency band which may be crowded, thus avoiding conflict with other wireless devices, ensuring the stability of the wireless network, preventing dropping phenomenon from happening, and improving the speed of the wireless network. In addition, or alternatively, the dual frequency wireless router may be configured to provide the 2.4 GHz frequency band as a public frequency band, such as for a guest network. Accordingly, the security constraints on the network of the 2.4 GHz frequency band may be relatively lax when compared to those of the network of the 5.0 GHz frequency. Therefore, by reconnecting to the 5.0 GHz frequency band, the terminal may reconnect to a more secure network.

Alternatively or in addition, the communication method may include the following S1-S3 steps.

In step S1, the terminal may detect whether the network that is currently accessed by the terminal and the network available to the target communication device are the same network.

In step S2, in response to detecting that the current network and the available network are not the same network, the terminal may disconnect from the current network and access the available network of the target communication device.

In step S3, the terminal may send a control signal to the target communication device through the available network of the target communication device, so that the target communication device performs a corresponding operation according to the control signal.

In the foregoing steps S1-S3, the available network for the target communication device may be determined according to network names. For example, the terminal may be authorized to connect to network-1 and network-2, and the target communication device is connected to the network-2. Then, after the terminal and the target communication device communicate for the first time, the terminal may record an identity of the target communication device and a SSID of the network (network-2) connected by the target communication device. In this way, when needing to be communicated with the target communication device next time, the terminal may automatically switch from network-1 to network-2 to realize the communication with the target communication device. The entire network switching process does not need participation of the user, for the terminal to be effectively and conveniently communicated with the target communication device.

Figure 3:
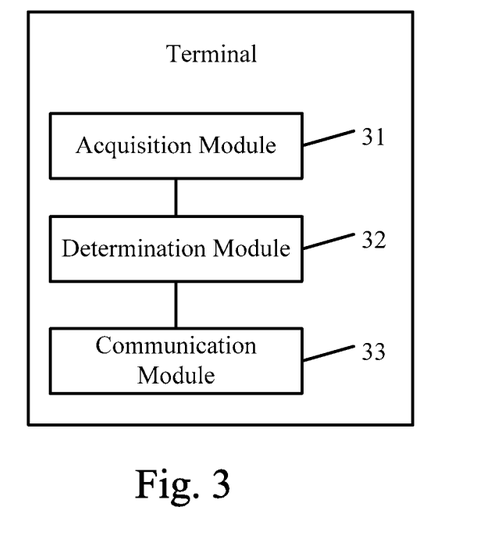
FIG. 3 is a block diagram illustrating a terminal, according to an exemplary embodiment.

FIG. 3 is a block diagram illustrating a terminal, according to an exemplary embodiment. Referring to FIG. 3, the terminal includes an acquisition module 31, a determination module 32, and a communication module 33.

The acquisition module 31 may receive a communication operation instruction, and determine a target communication device corresponding to the communication operation instruction.

The determination module 32 may determine a network being used by the target communication device.

The communication module 33 may access the network determined by the determination module 32, and connect the terminal to the network. The terminal may then communicate with the target communication device through the network.

In an example, the communication operation instruction received by the acquisition module 31 may be an activation instruction for operating an application. The application may be stored with at least one communication device identity. The communication device identity may be a unique identifier associated with a communication device. For example, the communication device identity may be an IP (Internet Protocol) address, a MAC (Media Access Control) address, a device name, a serial number, or any other unique identifier.

The acquisition module 31 may select a communication device identity from those stored based on a user-operation in the application. The acquisition module 31 may identify a communication device corresponding to the selected communication device identity as the target communication device.

Alternatively or in addition, the determination module 32 may look up a network frequency band supported by the target communication device. The determination module 32 may identify the network being used by the target communication device according to the network frequency band.

For example, the application may be stored with network frequency bands supported by each communication device corresponding to each communication device identity.

Figure 4:
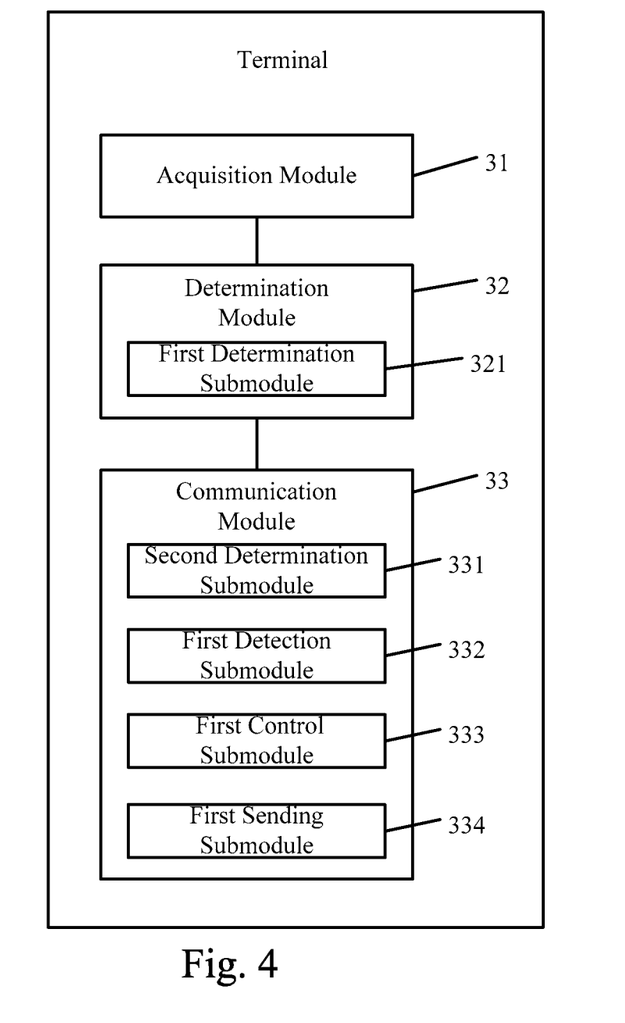
FIG. 4 is a block diagram illustrating another terminal, according to an exemplary embodiment.

In an example, as shown in FIG. 4, the determination module 32 may include a first determination submodule 321.

The first determination submodule 321 may determine the network frequency band of the network being used by the target communication device as a first frequency band.

The communication module 33 may include a second determination submodule 331, a first detection submodule 332, a first control submodule 333, and a first sending submodule 334.

The second determination submodule 331 may detect the network that the terminal is currently connected to. The second determination submodule 331 may determine a network frequency band of the current network as a second frequency band.

The first detection submodule 332 may detect whether the first frequency band determined by the first determination submodule 321 and the second frequency band determined by the second determination submodule 331 are the same frequency band.

The first control submodule 333, in response to the detection submodule 332 determining that the first frequency band and the second frequency band are not the same frequency band, may enable a first network module and disable a second network module. The first network module may be used to connect the terminal to a network of the first frequency band, and the second network module may be used to connect the terminal to a network of the second frequency band.

The first sending submodule 334 may access the network being used by the target communication device through the first network module, and send control signaling to the target communication device through the network. The target communication device may perform a corresponding operation according to the control signaling.

In an example, the first frequency band determined by the first determination submodule 321 may be 5.0 GHz. Other first frequency bands may be possible.

In an example, the second frequency band determined by the second determination submodule 331 may be 2.4 GHz. Other second frequency bands may be possible.

The target communication device may be a communication device that only supports the second frequency band, or in above example, only 2.4 GHz frequency band.

Alternatively or in addition, in an example, the application may be stored with network identities of networks connected by each communication device corresponding to each communication device identity.

The second detection submodule may detect whether the current network that the terminal is currently connected to and the network that the target communication device is connected to are the same network based on the network identities. For example, a network identity may be an SSID of the network.

The second control submodule, in response to the second detection submodule detecting that the current network and the available network are not the same network, may disconnect the terminal from the current network and connect the terminal to the network of the target communication device.

The second sending submodule may send control signaling to the target communication device through the network of the target communication device, so that the target communication device may perform a corresponding operation according to the control signaling.

In addition, the first control submodule or the second control submodule may disconnect the terminal from the network of the target communication device and reconnect to the network the terminal was connected to previously after the communication with the target communication device is completed.

As described throughout the present document, the terminal may support networks at both, a first network frequency band and a second network frequency band. In an example, the terminal may only work with one network frequency band at a time, such as the first network frequency band or the second network frequency band. The target communication device too may only support one network frequency band, such as the first network frequency band. In this case, the terminal may identify an available network that is being operated at the first frequency band, and connect to the available network. The terminal may, subsequently communicate with the target communication device via the available network. During this process, if the terminal determines that the terminal is currently connected to a second network of the second frequency band, the terminal may disconnect from the second network prior to connecting to the available network.

With respect to the devices in the above embodiments, the specific manners for performing operations for individual modules therein have been described in detail in the embodiments regarding the methods, which will not be elaborated herein.

Figure 5:
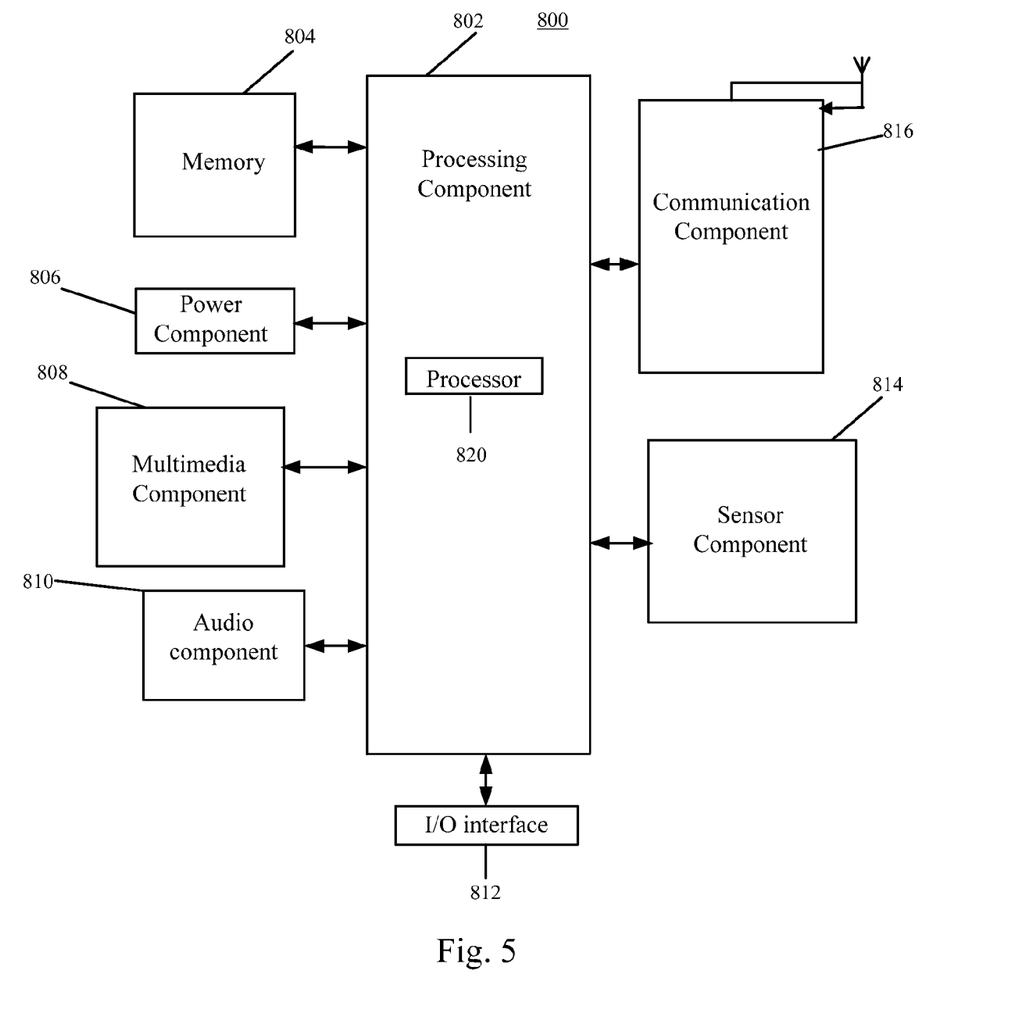
FIG. 5 is a block diagram illustrating a device, according to an exemplary embodiment.

FIG. 5 is a block diagram illustrating an example device, such as a terminal 800 for realizing the communication method provided by the present disclosure, according to an exemplary embodiment. For example, the terminal 800 may be a mobile phone, a computer, a digital broadcast terminal, a messaging device, a gaming console, a tablet, a medical device, exercise equipment, a personal digital assistant, and the like. The target communication device may be another terminal.

Referring to FIG. 5, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 may control overall operations of the terminal 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 may store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 may provide power to various components of the terminal 800. The power component 806 may include a power management system, one or more power sources, and any other components associated with the generation, management, and distribution of power in the terminal 800.

The multimedia component 808 may include a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 may output and/or input audio signals. For example, the audio component 810 may include a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 may provide an interface between the processing component 802 and peripheral interface modules, such as a keyboard, a click wheel, buttons, and the like. The buttons may include, but are not limited to, a home button, a volume button, a starting button, and a locking button.

The sensor component 814 may include one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 may facilitate communication, wired or wirelessly, between the terminal 800 and other devices, such as the target communication device. The terminal 800 may access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. For example, the processing component 802 may be a central processor of the terminal 800 responsible for execution of an operating system, control instructions, and applications installed on the terminal 800. The processing component 802 may be one or more devices operable to execute logic. The logic may include computer executable instructions or computer code embodied in the memory 804 or in other memory that when executed by the processing component 802, cause the processing component 802 to perform the features implemented by the logic. The computer code may include instructions executable with the processing component 802. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processing component 802 may be a general processor, central processing unit, server, ASIC, digital signal processor, FPGA, digital circuit, analog circuit, or combinations thereof. The processing component 802 may be in communication with the memory 804 and the other components of the terminal 800.

In exemplary embodiments, there is also provided a non-transitory computer readable storage medium including instructions, such as included in the memory 804, executable by the processor 820 in the terminal 800, for performing the above-described methods. For example, the non-transitory computer-readable storage medium may be a ROM, a RAM, a CD-ROM, a magnetic tape, a floppy disc, an optical data storage device, and the like.

As used throughout the present document, a second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

As described in detail by the examples above, the terminal may be a communication device equipped with circuitry that facilitates connecting to a wireless network. The wireless network may be provided by a wireless router. The router may provide multiple wireless networks, each using a respective frequency band. The circuitry may support multiple frequency bands, where each frequency band is an Other embodiments will be apparent to those skilled in the art from consideration of the specification. This application is intended to cover any variations, uses, or adaptations following the general principles described throughout the present disclosure and including such departures from the present disclosure as come within known or customary practice in the art. It is intended that the specification and examples be considered as exemplary only.

It will be appreciated that the exact construction that has been described above and illustrated in the accompanying drawings is exemplary, and that various modifications and changes can be made without departing from the scope thereof.

What is claimed is:

1. A terminal, comprising:
a communication module connected to a wireless router via a first network;
a processor; and
a memory for storing instructions executable by the processor;
wherein the processor is configured to:
receive a communication operation instruction, wherein the received communication operation instruction comprises an activation instruction for operating an application, the application being stored with at least one communication device identity;
select a communication device identity based on an operation in the application;
determine a target communication device as a communication device corresponding to the selected communication device identity, wherein the target communication device is connected to said wireless router via a second network;
connect to the second network;
communicate with the target communication device through the second network;
look up a network frequency band supported by the target communication device, wherein the application is stored with network frequency bands supported by each communication device corresponding to each stored communication device identity; and
determine the second network of the target communication device according to the network frequency band.

2. The terminal according to claim 1, wherein the processor is further configured to:
determine a first network frequency band of the first network being used by the terminal, and wherein the network frequency band of the second network is a second network frequency band;
detect whether the determined first network frequency band and the second frequency band are the same;
in response to the first frequency band and the second frequency band not being the same, disable a first network module and enable a second network module, the first network module configured to connect the terminal to the first network frequency band, and the second network module configured to connect the terminal to the second network frequency band; and
access the second network through the second network module, and send control signaling to the target communication device through the second network, so that the target communication device performs a corresponding operation according to the control signaling.

3. The terminal according to claim 2, wherein:
the target communication device only supports the second network frequency band of the second network.

4. The terminal according to claim 1, wherein the application is further stored with network identities of networks connected by each communication device corresponding to each communication device identity, and the processor is further configured to:
determine whether the first network that is currently accessed by the terminal and the second network are the same network based on the respective network identities;
in response to the first network and the second network not being the same network, disconnect the terminal from the first network and connect the terminal to the second network; and
send control signaling to the target communication device through the second network, so that the target communication device performs a corresponding operation according to the control signaling.

5. The terminal according to claim 2, wherein:
the processor is further configured to disconnect the terminal from the second network and reconnect the terminal to the first network after the communication with the target communication device is completed.

6. The terminal according to claim 4, wherein:
the processor is further configured to disconnect the terminal from the second network and reconnect the terminal to the first network after the communication with the target communication device is completed.

7. The terminal according to claim 2, wherein:
the first network frequency band of the first network is 5.0 GHz; and
the second network frequency band of the second network is 2.4 GHz.

8. A non-transitory readable storage medium comprising instructions, executable by a processor in a terminal, for performing a communication method, the method comprising:
receiving a communication operation instruction by the terminal, the terminal connected to a first network provided by a wireless router, wherein the received communication operation instruction comprises an activation instruction for operating an application, the application being stored with at least one communication device identity;
selecting a communication device identity based on an operation in the application;
determining a target communication device as a communication device corresponding to the selected communication device identity;
determining a second network that the target communication device is connected to, the second network provided by said wireless router;
connecting the terminal to the second network;
establishing a communication between the terminal and the target communication device through the second network;

looking up a network frequency band supported by the target communication device, wherein the application is stored with network frequency bands supported by each communication device corresponding to each stored communication device identity; and determining the second network of the target communication device according to the network frequency band.

9. The non-transitory readable storage medium according to claim 8, wherein the application is associated with a first network identity of the communication network being used by the target communication device, the method further comprising:

identifying a second network identity of a communication network that the terminal is currently connected to;

comparing the first network identity and the second network identity; and in response to the first network identity and the second network identity not being the same, disconnecting the terminal from the communication network that the terminal is currently connected to and connecting the terminal to the communication network being used by the target communication device.

10. The non-transitory readable storage medium according to claim 9, wherein the method further comprises:

sending a control signal to the target communication device through the communication network being used by the target communication device, so that the target communication device performs a corresponding operation according to the control signal.

* * * * *